Patented Sept. 22, 1936

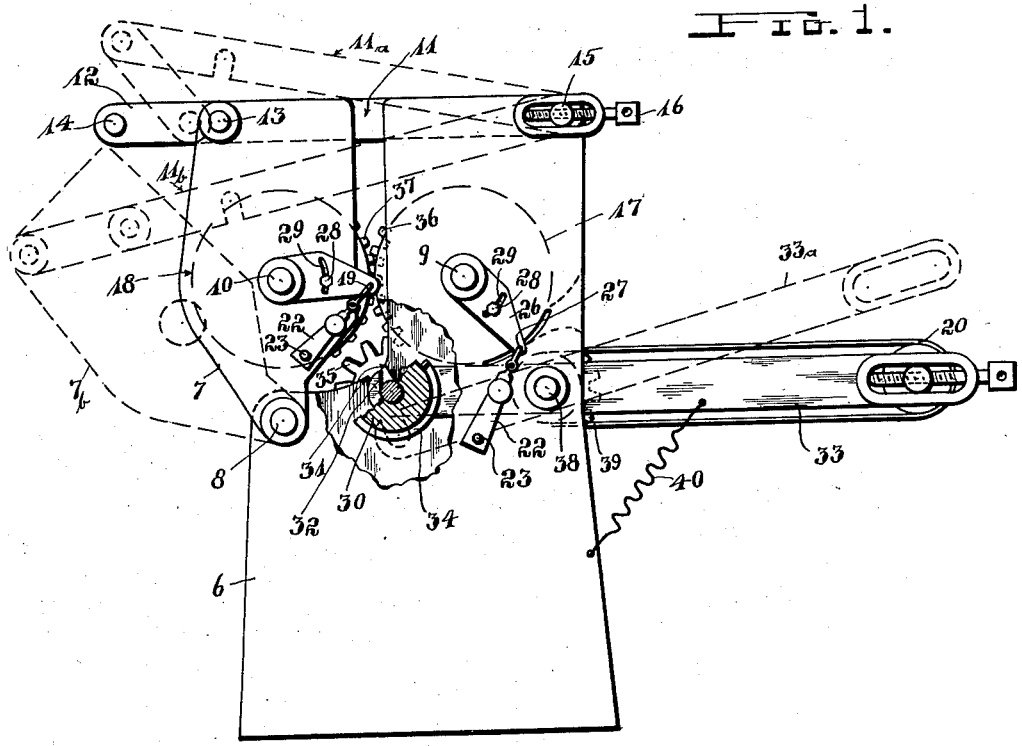

2,055,205

UNITED STATES PATENT OFFICE 2,055,205

TORTILLA MACHINE

Armando J. Pereyra, San Francisco, Calif.

Application April 6, 1934, Serial No. 719,280

3 Claims. (Cl. 107—23)

This invention relates to devices used in making tortillas.

One of the objects of this invention is to provide a tortilla machine with means whereby any unevenness in a tortilla can be mended or corrected in a very short time and with practically no waste of material.

Another object is to provide means for exchanging rollers while the machine remains in operating condition except for the individual roller handled at the time.

Another object is to provide means for releasing rollers without changing any adjustments between the rollers.

Another object is to provide means for automatically holding the form-roller under tension against another roller.

Another object is to provide means for automatically keeping the stripping wires taut.

Another object is to provide adjustability for the stripping wires as to the point or line of stripping the dough from the rollers with respect to the periphery of the rollers.

Other objects will appear from the following description and appended claims as well as from the accompanying drawing, in which—

Fig. 1 is a side elevation of a tortilla machine partly cut away to show otherwise covered working parts.

Fig. 2 is a fragmentary top plan view of the link connection for separating the rollers.

Fig. 3 is a top plan or edge view of the means for maintaining the stripping wires taut, easily released and exchangeable.

Fig. 4 is a plan view of the rollers showing the position of the stripping wires and rings.

Tortillas are customarily made very thin, and, in this condition, are liable to tear whenever the least small grain happens to come between the rollers, the grain becoming lodged between the closely set rollers so that no dough can pass, resulting in a tear or hole within the rolled-out tortilla.

Under such conditions, customarily the dough is removed or withdrawn sufficiently from above the rollers or within the hopper in order that the grain may be removed from its lodged position or from the mass of dough entirely, which, of course, requires considerable time, and causes an interruption of the operation.

Tortilla-dough, on the other hand, has the tendency of sticking to the rollers, for which reason stripping wires are commonly applied, and a part of the cleaning operation therefore also includes a cleaning of such a wire, by means of the fingers, or cloth, or a string, all of which necessitates and causes loss of time and an interruption of the regular operation.

Consideration has furthermore to be given to the forming roller, which also may clog up, or there may be a requirement in the trade or a desire to exchange different rollers for different forms or size.

An arrangement disclosed herewith serves to take care of or provide for any such possibilities.

The combination frame-structure is therefore designed to comprise a main stationary portion 6 and a tiltably mounted portion 7, supported on the pivot 8 in the main-frame portion. One main roller is turnably mounted in the main-portion 6 supported on the shaft 9 and another main-roller is turnably supported on the shaft 10 in the tiltable portion 7.

Under these conditions the main rollers can be approached to a very close setting for the sake of getting and producing thin tortillas, on the one hand, and, on the other hand, the rollers may be separated to a considerable extent when a clogging is to be mended or any change on the machine is to be made, such as exchanging different mold or form rollers.

The tiltable portion 7 is held in operative relation to the main frame structure 6 by the link members 11 and 12, illustrated in Figs. 1 and 2. The link member 12 is pivotally connected to the tiltable portion 7 by means of the shaft or rod 13 at one end, while the other end of the link-member 12 is pivotally connected to one end of the link-member 11 by means of the shaft or rod 14. The opposite end of the link-member 11 is pivotally connected to the main-frame 6 by means of the rod or bar 15.

An adjustment of the tiltable portion 7 with respect to the main portion 6 to a closer or wider setting between the two portions is accomplished by means of the set-screw 16.

Such link-members may be in the middle between the oppositely disposed frame-portions of a tortilla machine or may be disposed in pairs, one of which to be near each of the oppositely disposed frame sides or end-pieces.

From the above it must be understood that by a slight or short lifting of the link-member, as, for instance, to the position indicated in dotted lines at 11a the tiltable portion 7 will be separated sufficiently from the stationary portion 6 so that the two main rollers mounted on the shafts 9 and 10 will be separated also, which is commonly sufficient to mend any clogging of grains in a dough between the rollers.

For instance, when dough is being passed between the two main rollers 17 and 18 while they are set for rolling out tortillas, they are customarily disposed rather closely so that a somewhat coarser than the average grain in the dough may easily become lodged between the rollers, particularly since a stripping wire 19 is desirably located closely below the point or line where the two rollers are nearest to one another. The rollers are then, of course, rotating for the rolling operation.

A slight lifting of the links as described above to the extent or even less than illustrated in Fig. 1 will normally suffice to cause such a clogged or lodged grain to move on with the turning rollers so that the links may be pressed down again after an instant separation of the rollers to a very slight extent beyond the desired thickness of the cake or tortilla so that the resulting tortilla may show only a hardly noticeable variation of thickness. At least, the operation of the machine does not have to be interrupted for any great length of time, as is common with other machines on such an occasion.

The main rollers 17 and 18 are preferably shaped with oppositely convex and concave faces as illustrated in an exaggerated manner in Fig. 4, to facilitate a placing of the stripping wires at the most desirable places, on the rearmost roller 18, for instance, straight across the face of this roller just below the contacting or nearly contacting line with the other roller, as already pointed out above; while on the front roller 17 the wire may be disposed just above the rearmost end of the conveyor 20 for transferring the finished tortillas to any desired place, this second wire 21 necessarily to be disposed in a slanting position across the face of the roller 17.

Any wire drawn straight across the face of a plain cylindrical roller might eventually easily be forced away from the face of the roller at or near the middle of such a roller, but, by making a roller of a convex form, even ever so slightly, the wire 19 can readily be drawn tight enough to result in a clean stripping of the dough from such a convex or barrel-shaped roller.

To produce an evenly thick tortilla, the second roller must, of course, be shaped correspondingly as, for instance, illustrated in Fig. 4, with a concave face.

Over such a concave roller a wire cannot very well be drawn so as to result in a clean stripping of dough from the periphery of the roller. The wire is therefore arranged in a slanting manner as clearly indicated at 21, not at all interfering with a proper operation of the machine inasmuch as the finished tortilla merely drops from the roller 17 upon the conveyor 20 and it is immaterial that one of the side edges of the finished tortilla drops slightly ahead of the remaining body of the tortilla when dropping upon the conveyor.

It is, however, important that both wires should be taut across the faces of the rollers in order to maintain the faces of the rollers absolutely clean and smooth if the cakes or tortillas are to be given a nice appearance; and the wires should also be adjusted to the most favorable position, for which reason the wires are provided with special tightening mountings or supports illustrated in Figs. 1 and 3, though one end of each wire may simply be hooked to the main-frame structure in a satisfactory manner.

The special tightening means for the opposite ends of the wires consists simply of the spring members 22 secured to the stationary portion 6 or to the tiltable portion 7 as indicated at 23 provided with a front hook-end 24, to which the loop-end of the wire is applied. A thumb or finger plate or disc 25 is provided on each tightening means to assure a suitable touch at a proper place for pressing upon the spring members.

This tightening means is designed of such a form and strength to suitably maintain a wire taut and at the same time to readily allow a detaching or an exchange of wires.

For adjusting the wires to certain preferred positions, an adjusting plate 26 is provided for each wire-end, the front end of the plate being provided with a hole through which a wire is passed for guidance and control of position. The plate itself is adjustable by means of a set-screw 28, a slot 29 in the plate 26 serving to allow a swinging of the plate around the shaft of the roller with respect to which the wire is arranged, so that the wire is maintained in a suitable position to the periphery of a roller in any adjusted position.

The links 11 and 12, moreover, serve to separate the main rollers for the purpose of exchanging different form- or mold-rollers, since the links can be swung to the position indicated in dotted lines at 11b, in which the tiltable portion of the main frame structure is swung to the position indicated in dotted lines at 7b, being suitably separated and spaced from the stationary portion 6 that the mold-roller may readily be removed from the notch 31 of the stationary portion 6 and from the cut-out 32 in the end of each of the bars 33 of the conveyor 20.

Having cut away a portion of the main structure 6, and having indicated half of a cross section of a mold-roller 30 with forming or molding flange 34, shows the end of the bar 33 with its cut-out 32 in the place where the half of the mold roller is broken away, and also shows the notch 31 in the main frame structure on the opposite end of the main structure behind the bar-end, whereby it will be clear just how the mold-roller may be removed from the machine, the gear 35 of the mold roller being easily disengaged from the gear 36 of the main roller 17 by a tilting of the conveyor bars to the position indicated in dotted lines at 33, the bars being swingable around the shaft 38, forming the driving shaft for the conveyor by means of the gear 39, also engaged with the gear 36 on the main roller 17.

The mold-roller is normally pressed against the main roller by the overbalanced weight of the conveyor, which is intensified by the spring 40, to assure a proper alignment of the mold roller with the main rollers at all times.

While the form or mold roller cuts out a tortilla from about the middle of the dough as it passes around the main-roller 17, excess dough is carried back into the hopper or back to a point above and between the two main rollers by means of rings 41, the rings being disposed in grooves 42 in the main roller 17 so that dough may remain adhering to the rings while the stripping wire passes between the rings and the main roller in such a manner as to separate the larger body of the dough from the main roller, the dough being adhesive enough to be carried on by the rings to the starting position between the main rollers.

Having thus described my invention, I claim:—

1. In a tortilla machine, pivotally connected frame-portions, main rollers carried by the portions, toggle-links connecting the frame portions, a conveyor pivotally connected to the portions in operative relation to the main rollers, and a form-roller carried on the innermost free end of the conveyor and thereby made removable by the tilting of the pivotally connected conveyor and by the toggle-controlled pivotally connected portions.

2. In a tortilla machine, a frame structure made in distinct portions of which one forms the main stationary portion and the other is tiltably connected to the main portion, a roller turnably mounted in each of the portions so that dough is forced to pass between the nearest points of the rollers, stripping means disposed to separate the dough from one of the rollers so as to be carried along by the other roller, and a control means pivotally connecting the portions including a toggle connection normally in closely folded position holding the portions in closely operating position and disposed over the top of the portions to be raised and thereby unfolded manually for separating the portions and thereby the rollers in case that the dough has become lodged between the rollers to an extent to interfere with the rolling of a fine sheet for tortillas.

3. In a tortilla machine, pivotally connected frame portions, a roller mounted in each of the portions to cooperate with one another for rolling dough, spring members mounted on the portions with spring-effect in axial direction of the rollers and having outwardly bent free ends near the periphery of the rollers, stripping means with loops at both ends hooked over the bent ends of the spring members and thereby disposed to frictionally engage over the peripheral faces of the rollers, and adjusting means between the spring members and the rollers mounted swingable with respect to and around the axes of the rollers and having guiding means near the periphery of the rollers for adjustably controlling the stripping line and time with respect to the faces of the rollers.

ARMANDO J. PEREYRA.